United States Patent [19]

Gargano

[11] Patent Number: 4,705,238
[45] Date of Patent: Nov. 10, 1987

[54] RAM AIR PARACHUTE WITH MULTIPLE PRESSURE CENTERS

[76] Inventor: William L. B. Gargano, 1516 Drexel Dr., Davis, Calif. 95616

[21] Appl. No.: 883,091

[22] Filed: Jul. 8, 1986

[51] Int. Cl.⁴ ............................................. B64D 17/02
[52] U.S. Cl. .................................... 244/145; 244/146
[58] Field of Search ............... 244/142, 145, 152, 146

[56] References Cited

U.S. PATENT DOCUMENTS

| | | | |
|---|---|---|---|
| Re. 26,427 | 7/1968 | Jalbert | 244/142 |
| 3,228,635 | 1/1966 | Hughes et al. | 244/145 |
| 3,285,546 | 11/1966 | Jalbert | 244/145 |
| 3,428,277 | 2/1969 | Everett, Jr. | 244/142 |
| 3,498,565 | 3/1970 | Nash-Boulden | 244/152 |
| 3,524,613 | 8/1970 | Reuter et al. | 244/142 |
| 3,525,491 | 8/1970 | Barish | 244/142 |
| 3,540,684 | 11/1970 | Snyder | 244/149 |
| 3,690,603 | 9/1972 | Lemoigne | 244/145 |
| 3,724,789 | 4/1973 | Snyder | 244/145 |
| 3,945,592 | 3/1976 | Sutton | 244/152 |
| 4,175,722 | 11/1979 | Higgins | 244/152 |
| 4,389,031 | 6/1983 | Whittington | 244/145 |
| 4,399,969 | 8/1983 | Gargano | 244/145 |

FOREIGN PATENT DOCUMENTS 0194013 9/1986 European Pat. Off. .
2141079 12/1984 United Kingdom ................ 244/145

OTHER PUBLICATIONS

"Parachutist", Aug. 1970, (cover) (a publication of the U.S. Parachute Assoc.).

Primary Examiner—Galen Barefoot
Attorney, Agent, or Firm—Baker, Maxham & Jester

[57] ABSTRACT

Upper and lower rectangular canopies are connected by a plurality of transversely spaced vertical airfoil shaped ribs to define a plurality of longitudinal air flow chambers. Suspension lines are connected to selected ones of the ribs and are arranged in longitudinally spaced and transversely extending rows. Cells are defined which consist of a plurality of adjacent chambers between any two transversely adjacent suspension lines. Some of the cells have three chambers while others have two chambers. The suspension line dimensions and trim angles are used to impart multiple pressure centers and different arc anhedral shapes to improve various characteristics of the parachute including opening, stability and accuracy.

20 Claims, 8 Drawing Figures

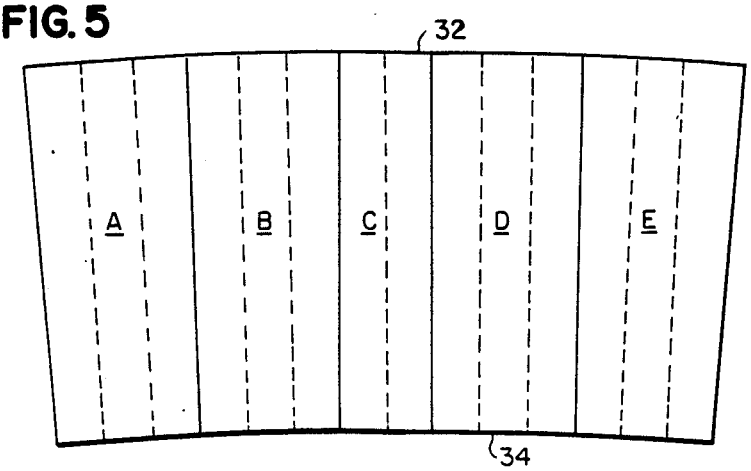
FIG. 5
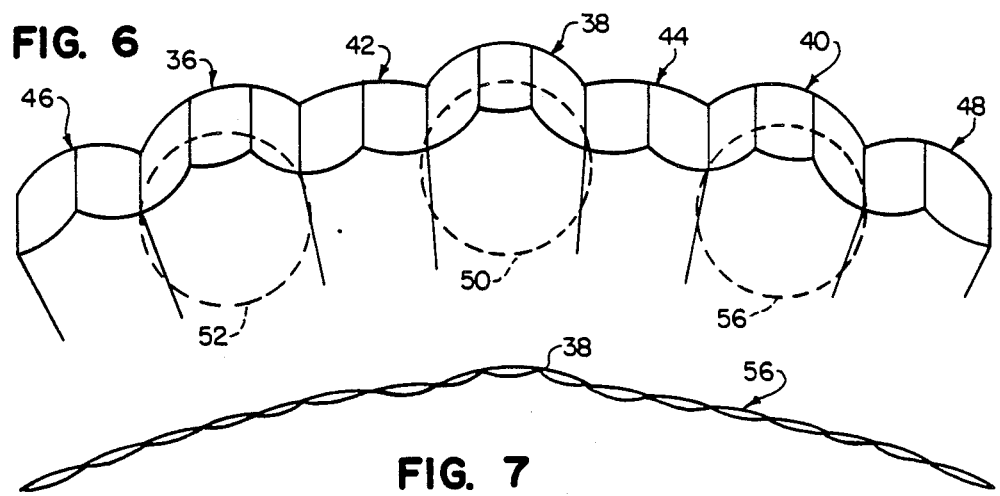
FIG. 6
FIG. 7
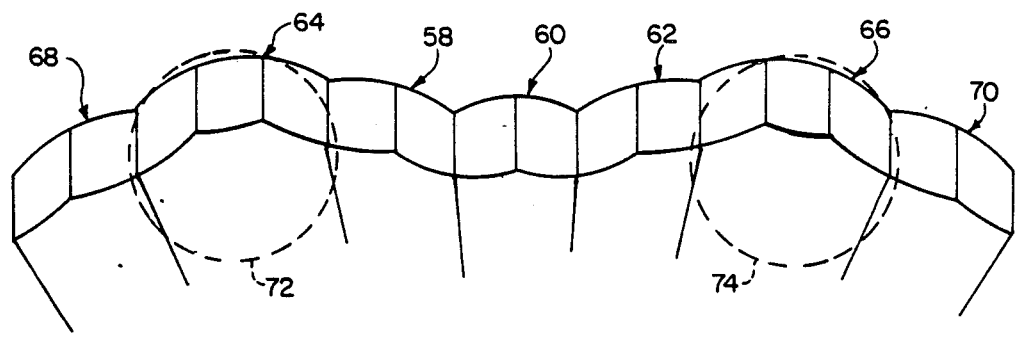
FIG. 8

RAM AIR PARACHUTE WITH MULTIPLE PRESSURE CENTERS

REFERENCE TO DISCLOSURE DOCUMENT

Reference is made to Disclosure Document No. 145817 filed on Feb. 18, 1986 and entitled "Multiple Pressure Centers Ram Air Parachutes (Gull Wing)" mailed by the inventor, William L. B. Gargano to the U.S. Patent and Trademark Office on Feb. 12, 1986.

BACKGROUND OF THE INVENTION

The present invention relates to parachutes, and more particularly, to gliding parachutes of the inflated ram air type.

For many years parachutes have been constructed by sewing a plurality of panels together to define a hemispherical structure when inflated. Some of these dome-like parachutes have incorporated slits, vents or baffles for controlling the flow of air therethrough, both to facilitate deployment and to provide maneuverability. However, these parachutes are adapted primarily for nearly vertical descent, and generally do not permit a load to be guided over substantial horizontal distances to a target landing area.

Recently, gliding parachutes have been developed for sport jumping, fire fighting, and military applications which can be readily manipulated to carry a load over a substantial distance. A typical gliding parachute is preformed and constrained in such a manner that when inflated it will define an airfoil in longitudinal section. When a load is suspended from this type of inflated parachute, the parachute will glide forwardly and its airfoil shape will provide the necessary lift. By controlling the peripheral edges of the gliding parachute, the parachute and the load can be guided in their path of descent to a target many miles away from the drop point.

Much emphasis has been placed on the fabric and rigging configurations of previous gliding parachutes in an effort to approximate, as close as possible, a conventional airfoil shape. This results in maximum lift for a given chute area which in turn provides the maximum glide ration.

In a multi-cell gliding parachute, upper and lower fabric canopies are connected by laterally spaced fabric ribs. Suspension lines are connected at their upper ends to the parachute and converge downwardly to a harness or other load supporting structure. The fabric sections of the parachute are normally made of a high strength, lightweight fabric of suitable porosity.

U.S. Pat. No. Re. 26,427 of Jalbert discloses a gliding parachute including an upper canopy and a bottom planar skin connected together by a plurality of vertically extending, spaced apart ribs to define longitudinal channels through which air flows to sustain a conventional, flat airfoil shape.

U.S. Pat. No. 3,724,789 of Snyder discloses a gliding parachute of the multi-channel type which also has a flat airfoil shape.

U.S. Pat. No. 4,399,969 of Gargano discloses another multi-cell gliding parachute in which the suspension lines and fabric sections are dimensioned to impart continuous transverse curvature.

U.S. Pat. No. 4,175,722 of Higgins also discloses a ram air parachute having a continuous transverse curvature.

U.S. Pat. No. 3,945,592 of Sutton discloses another ram air parachute having a flat airfoil shape (See FIG. 16).

U.S. Pat. No. 3,540,684 of Snyder discloses in FIG. 5 discloses a twin lobe parachute with no lower canopy.

U.S. Pat. No. 3,524,613 of Reuter et al. discloses in FIG. 5 an inflated wing parachute in which the side portions of the canopy extend upwardly from the central pair of scoop openings 60. The upper canopy has a triangular shape in plan form (See column 4, lines 7–11).

U.S. Pat. No. 3,498,565 of Nash-Boulden discloses a single canopy with a triangular plan form and a pair of lobes.

U.S. Pat. No. 3,428,277 of Everett, Jr. discloses a single canopy provided with air scoops on the leading edge to prevent buckling thereof. In FIG. 3 the parachute appears to have two side lobes.

Finally, U.S. Pat. No. 3,228,635 of Hughes et al. discloses in FIG. 5 a single, triangular canopy having two side lobes.

Heretofore the suspension lines of air parachutes have been connected to every rib or to every other rib.

SUMMARY OF THE INVENTION

It is the primary object of the present invention to provide an improved ram air parachute.

It is another object of the present invention to provide a ram air parachute with improved stability in flight.

It is another object of the present invention to provide a ram air parachute with improved maneuverability.

It is another object of the present invention to provide a ram air parachute that has an easily adjustable and stable rate of descent.

According to the present invention, upper and lower rectangular canopies are connected by a plurality of transversely spaced vertical airfoil shaped ribs to define a plurality of longitudinal air flow chambers. Suspension lines are connected to selected ones of the ribs and are arranged in longitudinally spaced and transversely extending rows. Cells are defined which consist of a plurality of adjacent chambers between any two transversely adjacent suspension lines. Some of the cells have three chambers while others have two chambers. The suspension line dimensions and trim angles are used to impart multiple pressure centers and different arc anhedral shapes to improve various characteristics of the parachute including opening, stability and accuracy.

BRIEF DESCRIPTION OF THE DRAWINGS

FIG. 5 is a top plan view of the upper canopy of the parachute of FIG. 1 illustrating how it is constructed of a plurality of generally trapezoidal shaped fabric sections sewn together along their adjacent longitudinal side edges.

FIG. 6 illustrates the leading edge of a second embodiment of my invention.

FIG. 7 illustrates the trailing edge of the second embodiment.

FIG. 8 illustrates the leading edge of a third embodiment of my invention.

DESCRIPTION OF THE PREFERRED EMBODIMENTS

The entire disclosure of my aforementioned U.S. Pat. No. 4,399,969 granted Aug. 23, 1983 and entitled "Gliding Parachute" is specifically incorporated herein by reference.

Figure 1:
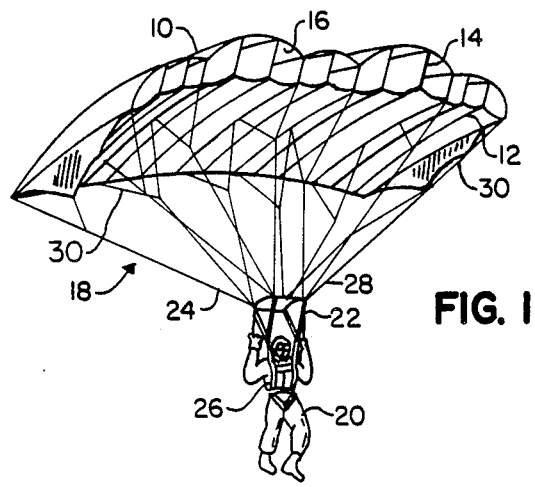
FIG. 1 is a perspective view of a first embodiment of my invention in flight showing a jumper suspended therefrom.

Referring to FIG. 1, a first embodiment of my ram air parachute includes aligned upper and lower fabric canopies 10 and 12, each having a generally rectangular configuration. The upper and lower canopies are connected by a plurality of transversely spaced vertical airfoil shaped fabric ribs 14 to define a plurality of longitudinally extending air flow chambers 16. The chambers have substantially equal transverse dimension. As the wing glides forwardly, air flows rearwardly through the chambers 16 to sustain the airfoil cross-section of the parachute.

Referring still to FIG. 1, a plurality of suspension lines 18 are connected to the fabric airfoil and extend downwardly in converging relationship to support a load which in the illustrated embodiment comprises a jumper 20. As is conventional, the lower portions of the suspension lines include four risers 22. The main rope portions 24 of the suspension lines are attached to the upper ends of the risers by connector links (not visible). The lower ends of the four risers 22 are in turn connected to a harness 26 worn by the jumper 20. Four separate groups of the rope portions 24 of the suspension lines are threaded through corresponding corners of a square slider 28. During deployment of the parachute, the slider 28 moves downwardly over the suspension lines until it reaches the position illustrated in FIG. 1, directly above the head of the jumper 20. The slider thus controls inflation of the parachute and prevents explosive openings thereof which could tear the parachute or severely pull on the jumper.

The slider 28 may be replaced with one that can be removed in flight to reduce noise and drag. See for example my co-pending U.S. patent application Ser. No. 759,609 filed July 26, 1985 and entitled "Removable Slider for Parachute Deployment."

The cascade lines 30 (FIG. 1) form the upper portions of the suspension lines. The upper ends of these lines are attached to corresponding ones of the ribs 14. The manner of attachment may be through the use of reinforcing tapes sewn across the ribs as more fully described in my copending U.S. patent application Ser. No. 759,455 filed July 26, 1985 and entitled "Parachute Suspension Line Attachment Structure." An alternate reinforcing tape construction for attaching the suspension lines to the ribs 14 is disclosed in U.S. Pat. No. 3,724,789 of Snyder entitled "Ram Air Glide Parachute."

Alternatively, the upper ends of the cascade lines 30 may be stitched to the apexes of reinforcing fabric triangles, the bases of which are stitched to the lower longitudinal edges of the ribs. See for example U.S. Pat. Re. No. 26,427 of Jalbert entitled "Multi-Cell Wing Type Aerial Device."

Figure 2:
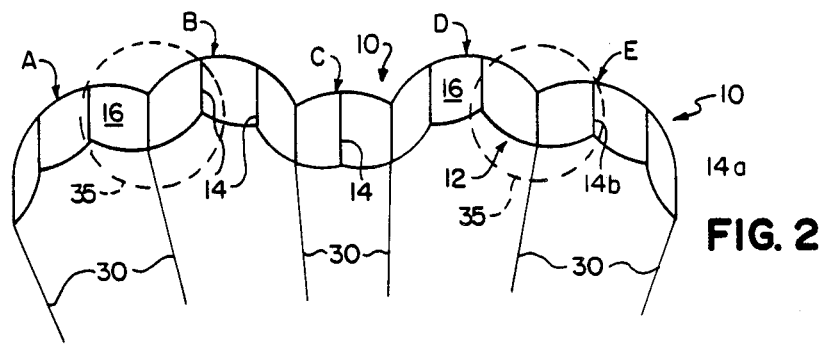
FIG. 2 is an enlarged elevation view of the leading multi-chamber edge of the inflated parachute of FIG. 1 illustrating its cells.

Referring still to FIG. 1, the cascade portions 30 of the suspension lines are arranged in longitudinally spaced and transversely extending rows. The cascade portions 30 of the suspension lines are only connected to certain ones of the ribs 14 in order to specially configure the shape of the airfoil as hereafter described. More specifically, the suspension lines are connected to the ribs to define five separate cells, labeled A through E in FIG. 2. A "cell" refers to any number of chambers between two transversely adjacent suspension lines. The center cell C has two chambers 16 while the cells A, B, D and E on either side each include three chambers 16. The center cell C includes a central rib and two side ribs, while each of the side cells include four ribs. As illustrated in FIG. 2, the cascade portions 30 of the suspension lines are connected only the the outermost ribs of the cells A through E. Accordingly, cells A, B, D and E have two ribs in the interior thereof which are not connected to any suspension lines. Cell C has a single central rib which is not connected to any suspension lines.

The angle at which a given suspension line is sewn to a rib is called the trim angle. In the first embodiment of my invention illustrated in FIGS. 1 and 2, the suspension lines are dimensioned and the trim angles at the nose are selected so that the inflated wing has two lobe arc anhedrals and an overall arc anhedral. The term "arc anhedral" refers generally to a spanwise curvature set primarily by the suspension line lengths. The gliding wing of FIGS. 1 and 2 have two centers of pressure, one around the junction of the A and B cells and another around the junction of the D and E cells.

Figure 4:
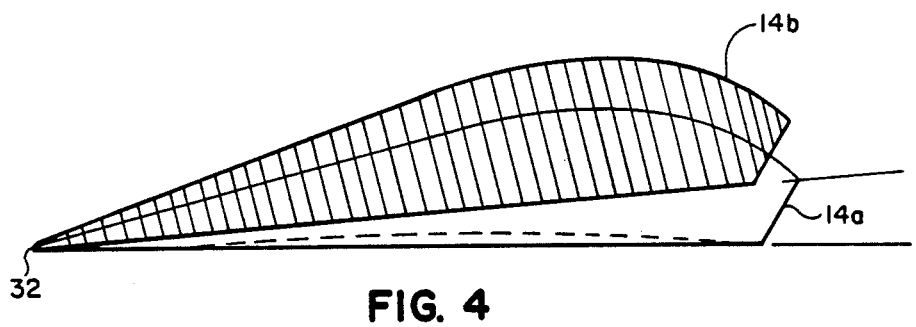
FIG. 4 is a greatly enlarged side elevation view illustrating the relative height difference between two of the ribs of the inflated parachute of FIG. 1.

FIG. 4 illustrates the relative height difference of the forward portions of a pair of adjacent ribs 14a and 14b noted in FIG. 2. The rearward portions of the ribs 14a and 14b converge to the trailing edge 32 of the wing.

Figure 3:
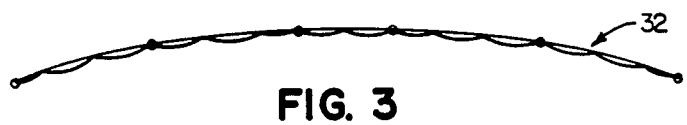
FIG. 3 is an enlarged elevation view of the trailing edge of the inflated parachute of FIG. 1.

FIG. 3 illustrates the trailing edge 32 of the first embodiment of my gliding parachute. The trim angles and suspension line lengths at the tail produce a single arc anhedral.

FIG. 5 illustrates the construction of the upper canopy 10 of the first embodiment. The lower canopy 12 has a similar construction. The upper canopy 10 is divided into generally trapezoidal shaped fabric sections A, B, D and E and rectangular center section C. These sections correspond to the similarly lettered cells of FIG. 2. The trailing edge 32 is thus longer than the leading edge 34. Preferably the trailing edge is about 10% longer than the leading edge. Because of the configurations of the sections, the leading and trailing edges are curved, and maintain a generally parallel relationship. The phantom lines in FIG. 5 illustrate the three chambers in the A, B, D and E cells and the two chambers in the center C cell.

The trapezoidal sections of the upper and lower canopies of the first embodiment of my parachute create a leading edge 34 which is concave relative to the forward direction of flight. This configuration forms a focal point and improves flight stability by keeping the parachute aimed in the desired direction even when subjected to turbulence or wind changes. The resulting wider tail increases the available drag area. This additional drag area can be used in deep braking modes to improve the fine tuning steering characteristics. The extra drag area also minimizes changes in the rate of descent. The widened tail, with its increased surface area, also establishes a larger pressure area in each lobe. This larger pressure area enhances stability and control.

The triple chamber cells of the first embodiment allow greater inflated fullness. The center chamber of this type of cell has very little distortion which allows it to act as a sort of anchor chamber. My first embodiment has dual pressure centers illustrated by phantom line circles 35. The pressure centers are spaced on opposite sides of a transverse midline of the parachute. By additionally defining the pressure centers with trim, the stability and focal point can be secured. The first embodiment of my invention provides a soft opening parachute which flies slowly with significant stability. The parachute is controllable and accurate when used in, and beyond, the full range of the normal jump operations envelope.

FIGS. 6 and 7 illustrate a second embodiment of my invention. It has three triple chamber cells 36, 38 and 40 separated by two double chamber cells 42 and 44, as well as two outboard double chamber cells 46 and 48. The trim angles and the suspension line lengths produce a single anhedral arc with three pressure centers 50, 52 and 54 designated by the phantom line circles in FIG. 6. Referring to FIG. 7, the suspension lines are dimensioned so that the trailing edge 56 of the second embodiment has an overall arc anhedral shape and a single lobe at the center cell 38.

In my second embodiment, the center three chamber cell 38 acts as an anchor and increases stability. The use of three triple chamber cells allows three pressure centers to be created. The parachute opens slowly and softly.

FIG. 8 illustrates a third embodiment of my invention which has three adjacent double chamber cells 58, 60 and 62 in the middle, two triple chamber cells 64 and 66 on either side of the the middle double chamber cells, and two outboard double chamber cells 68 and 70. The suspension line lengths and trim angles are set to provide two pressure centers 72 and 74 under corresponding ones of the triple chamber cells.

Having described preferred embodiments of my ram air parachute with multiple pressure centers, it will be understood by those skilled in the art that my invention can be further modified in arrangement and detail. Therefore the protection afforded my invention should only be limited in accordance with the scope of the following claims.

I claim:
1. An inflatable gliding wing parachute, comprising:
   an upper, generally rectangular canopy;
   a lower, generally rectangular canopy;
   a plurality of airfoil shaped ribs connecting the upper and lower canopies to define a plurality of longitudinally extending air flow chambers;
   a plurality of suspension lines having their upper ends attached to corresponding ones of the ribs and being arranged in longitudinally spaced and transversely extending rows, the suspension lines being dimensioned and attached to preselected ones of the ribs at preselected trim angles to define at least two cells each made of three adjacent chambers with suspension lines connected only to the outermost ribs thereof, and at least one remaining cell made of two adjacent chambers with suspension lines connected only to the outermost ribs thereof;
   whereby the parachute, when inflated during flight, will have at least two transversely spaced centers of air pressure.

2. An inflatable gliding wing parachute according to claim 1 wherein there are four cells made of three chambers each, the cells being positioned on opposite sides of a transverse midline of the canopies.

3. An inflatable gliding wing parachute according to claim 2 wherein there is a single cell made of two chambers, and a pair of three chamber cells are positioned on each side of the two chamber cell.

4. An inflatable gliding wing parachute according to claim 3 wherein the suspension lines are dimensioned to produce two arc anhedral lobes at a leading edge of the parachute.

5. An inflatable gliding wing parachute according to claim 4 wherein the suspension lines are dimensioned to produce single arc anhedral at a trailing edge of the parachute.

6. An inflatable gliding wing parachute according to claim 1 wherein each canopy is made of a center rectangular section and a plurality of trapezoidal shaped sections on either side of the center section so that the leading and trailing edges of the parachute are curved and parallel.

7. An inflatable gliding wing parachute according to claim 6 wherein the leading edge of the parachute is concave relative to a forward direction of flight.

8. An inflatable gliding wing parachute according to claim 1 wherein the parachute has three cells having three chambers each and four cells having two chambers each, one of the three chamber cells being positioned in the transverse center of the parachute, and the two chamber and three chamber cells alternating moving in a transverse direction from one end of the parachute to the other end.

9. An inflatable gliding wing parachute according to claim 8 wherein the suspension lines are dimensioned so that a pressure center is formed under each of the three chamber cells adjacent a leading edge of the parachute and so that a trailing edge of the parachute has a single arc anhedral shape with a single lobe in a transverse middle portion thereof.

10. An inflatable gliding wing parachute according to claim 1 wherein the parachute has three adjacent two chamber cells forming a transverse middle portion thereof, a pair of three chamber cells positioned on either side of the transverse middle portion, and a pair of outboard two chamber cells positioned on an outer side of each of the three chamber cells.

11. An inflatable gliding wing parachute, comprising:
   an upper, generally rectangular canopy;
   a lower, generally rectangular canopy;
   a plurality of airfoil shaped ribs connecting the upper and lower canopies to define a plurality of longitudinally extending air flow chambers;
   a plurality of suspension lines having their upper ends attached to corresponding ones of the ribs and being arranged in longitudinally spaced and transversely extending rows, the suspension lines being dimensioned and attached to preselected ones of the ribs at preselected trim angles to define at least two cells each made of three adjacent chambers with suspension lines connected only to the outermost ribs thereof, and at least one remaining cell made of two adjacent chambers with suspension lines connected only to the outermost ribs thereof;
   whereby the parachute, when inflated during flight, will have at least two arc anhedral lobes along a leading edge thereof.

12. An inflatable gliding wing parachute according to claim 11 wherein there are four cells made of three chambers each, the cells being positioned on opposite sides of a transverse midline of the canopies.

13. An inflatable gliding wing parachute according to claim 12 wherein there is a single cell made of two chambers, and a pair of three chamber cells are positioned on each side of the two chamber cell.

14. An inflatable gliding wing parachute according to claim 11 wherein the suspension lines are dimensioned to produce a single arc anhedral at a trailing edge of the parachute.

15. An inflatable gliding wing parachute according to claim 11 wherein each canopy is made of a center rectangular section and a plurality of trapezoidal shaped sections on either side of the center section so that the leading and trailing edges of the parachute are curved and parallel.

16. An inflatable gliding wing parachute according to claim 15 wherein the leading edge of the parachute is concave relative to a forward direction of flight.

17. An inflatable gliding wing parachute according to claim 11 wherein the parachute has three cells having three chambers each and four cells having two chambers each, one of the three chamber cells being positioned in the transverse center of the parachute, and the two chamber and three chamber cells alternating moving in a transverse direction from one end of the parachute to the other end.

18. An inflatable gliding wing parachute according to claim 17 wherein the suspension lines are dimensioned so that a pressure center is formed under each of the three chamber cells adjacent the leading edge of the parachute and so that a trailing edge of the parachute has a single arc anhedral shape with a single lobe in a transverse middle portion thereof.

19. An inflatable gliding wing parachute according to claim 11 wherein the parachute has three adjacent two chamber cells forming a transverse middle portion thereof, a pair of three chamber cells positioned on either side of the transverse middle portion, and a pair of outboard two chamber cells positioned on an outer side of each of the three chamber cells.

20. An inflatable gliding wing parachute, comprising:
an upper, generally rectangular canopy;
a lower, generally rectangular canopy;
a plurality of airfoil shaped ribs connecting the upper and lower canopies to define a plurality of longitudinally extending air flow chambers;
a plurality of suspension lines having their upper ends attached to corresponding ones of the ribs and being arranged in longitudinally spaced and transversely extending rows, the suspension lines being attached to preselected ones of the ribs to define four cells each made of three adjacent chambers with suspension lines connected only to the outermost ribs thereof, and one remaining cell made of two adjacent chambers with suspension lines connected only to the outermost ribs thereof; and
wherein a pair of the three chamber cells is positioned on each side of the two chamber cell.

* * * * *